United States Patent [19]

Andrew et al.

[11] Patent Number: 4,917,204
[45] Date of Patent: Apr. 17, 1990

[54] MATERIALS HANDLING VEHICLE

[75] Inventors: Robert J. Andrew, Congleton; Roger A. Frost, Uttoxeter; Paul F. Herbert, Stoke-on-Trent, all of United Kingdom

[73] Assignee: J. C. Bamford Excavators Limited, Rocester, United Kingdom

[21] Appl. No.: 221,762

[22] Filed: Jul. 20, 1988

[30] Foreign Application Priority Data

Jul. 21, 1987 [GB] United Kingdom ............... 8717192

[51] Int. Cl.$^4$ ............................................. B62D 5/06
[52] U.S. Cl. .................................................. 180/140
[58] Field of Search ..................... 180/140; 280/91, 99

[56] References Cited

U.S. PATENT DOCUMENTS

| | | | |
|---|---|---|---|
| 3,185,245 | 5/1965 | Hoyt | 180/140 |
| 3,750,834 | 8/1973 | Luft | 180/140 |
| 4,175,638 | 11/1979 | Christesen | 180/140 |

Primary Examiner—John A. Pekar
Attorney, Agent, or Firm—Spensley Horn Jubas & Lubitz

[57] ABSTRACT

A materials handling vehicle having two pairs of ground wheels movable to effect steering of the vehicle, the wheels of each pair being mounted at opposite sides of the vehicle chassis, at least one pair of wheels being lockable in a position so that steering is effected solely by the other pair of wheels wherein sensor means are provided associated with each of the two pairs of wheels to provide an electrical signal to a control means when the respective wheels are in an aligned position in which their axes of rotation are perpendicular to a longitudinal axis of the vehicle, the control means including a selector means comprising electrical switch means to enable an operator to select simple steering mode in which only one of the pairs of wheels are movable to effect steering, or a compound steering mode in which both of the pairs of wheels are movable to effect steering, the control means further comprising means to maintain the selected steering mode until an alternative steering mode is selected by operation of the selector means and the control means receives a signal from at least one of the sensor means associated with one of the pairs of wheels.

13 Claims, 5 Drawing Sheets

MATERIALS HANDLING VEHICLE

BACKGROUND TO THE INVENTION

1. Field of the Invention.

This invention relates to a vehicle and more particularly to a materials handling vehicle of the kind (hereinafter referred to as being of the kind specified) comprising an elongate chassis having at least two pairs of ground wheels which are movable by an operator to effect steering of the vehicle, the wheels of each pair being mounted at opposite sides of the chassis, at least one pair of the wheels being lockable in a position such that steering is effected solely by the other pair of wheels.

Such vehicles are known which comprise a front pair of wheels and a rear pair of wheels, the operator having a selector to lock the rear wheels so that two wheel or simple steering is effected solely by the front wheels. Also upon operation of the selector, the rear wheels may be released from the locked condition and coupled to the front wheels so that as a steering wheel or other control is operated is operated, the operator can perform compound steering using all four wheels so that the rear wheels are moved either in the same sense as the front wheels, whereby the vehicle performs what is known as "crabbing" or in an opposite sense to the front wheels so that the vehicle can perform what is known as "cramping".

After crabbing or cramping, when it is desired to return the vehicle to simple two wheel steering, it is necessary for the rear wheels to be lined up so that the wheels are parallel to the longitudinal axis of the chassis, or else the vehicle will not handle properly when in simple two wheel steering operation, and the tyres on the rear wheels particularly may become prematurely worn.

U.S. Pat No. 3,185,245 discloses a vehicle of the kind specified having a control means to enable an operator to select simple or compound steering and to ensure that the lockable wheels are locked in an aligned position when changing from compound to simple steering, and to ensure that the two pairs of wheels moved in phase when changing from simple to compound steering. By "in-phase" we mean that the angles between the front wheels and the longitudinal axis of the vehicle are of generally the same magnitude as the angles between the rear wheels and the longitudinal axis of the chassis.

However in the arrangement shown in U.S. Pat. No. 3,185,245 a selection of simple or compound steering is not entirely at the discretion of the operator. Particularly when an out of phase condition is sensed, the control circuit automatically adopts a simple steering mode until the phase is corrected, and in the event of for example an interruption of power supply to the control circuit, on reconnection of the control circuit to the power supply the operator will find that he cannot readily select compound or simple steering.

SUMMARY OF THE INVENTION

According to one aspect of the invention we provide a vehicle of the kind specified wherein sensor means are provided associated with each of the two pairs of wheels to provide an electrical signal to a control means when the respective wheels are in an aligned position in which their axes of rotation are generally perpendicular to the longitudinal axis of the vehicle, the control means including a selector means comprising electrical switch means to enable an operator to select simple steering mode in which only one of the pairs of wheels are movable to effect steering, or a compound steering mode in which both of the pairs of wheels are movable to effect steering, the control means further comprising means to maintain the selected steering mode until an alternative steering mode is selected by operation of the selector means and the control means receives a signal from at least one of the sensor means associated with one of the pairs of wheels.

Thus the change from simple to compound steering or vice versa is entirely at the discretion of the operator. Furthermore, in the event of an interruption of a power supply to the control circuit, upon the power supply being restored, simple or compound steering as selected will automatically be available to the operator.

Preferably, steering of the vehicle is effected by moving the wheels of the vehicle solely by using hydraulic actuators operated by hydraulic valve means. Further electrically operated valve means controlled by the control means may be provided to lock at least one of the pairs of wheels in an aligned position or to permit both of the pairs of wheels to move together each in response to a steering control.

The electrically operated valve means may be solenoid operated, in which case the control means may include a latchable switch means which operated when unlatched to cause the electrically operated valve means to be operated to lock at least one pair of wheels in an aligned position, and the latchable switch means when latched operating a solenoid to cause the electrically operated switch means to be operated to permit both of the pairs of wheels to move together in response to the steering control.

Preferably, the electrically operated valve means has first and second solenoids, the control means including a first latchable switch means which, when latched, operates the first solenoid whereby vehicle steering is effected in a first compound steering mode, e.g., cramping, and a second latchable switch means which when latched, operates the second solenoid whereby the vehicle steering is effected in a second compound steering mode, e.g., crabbing.

Each of the first and second latchable switch means may comprise bistable relays or double acting relays as required.

It will be appreciated that the or each latchable switch means will remain latched until an alternative steering mode is selected by the operator and a signal is received from at least one of the sensor means.

If desired, an indicator means may be provided to indicate to the operator whether simple steering or compound steering and where appropriate, whether first or second compound steering mode is selected on the selector means.

Preferably means are provided to isolate the control means from the power supply, for example through the ignition switch when the vehicle is parked, but it will be appreciated that control means when power is restored, at least initially, will effect the steering mode selected when the control means was isolated.

The signal from the sensor means may conveniently comprise the completion or interruption of an electrical circuit.

According to a second aspect of the invention we provide a method of operating a vehicle according to the first aspect of the invention to bring into phase two pairs of wheels which are movable to effect compound steering of the vehicle, the method including the step of selecting on the selector means simple steering mode and operating a steering control to bring one of the pairs of wheels to an aligned position at which the pairs of wheels becomes immovable, and reselecting compound steering mode and bringing the still movable pair of wheels to an aligned position using the steering control when compound steering mode will again be effected.

BRIEF DESCRIPTION OF THE DRAWINGS

The invention will now be described with the aid of the accompanying drawings in which.

DESCRIPTION OF THE PREFERRED EMBODIMENTS

Figure 1:
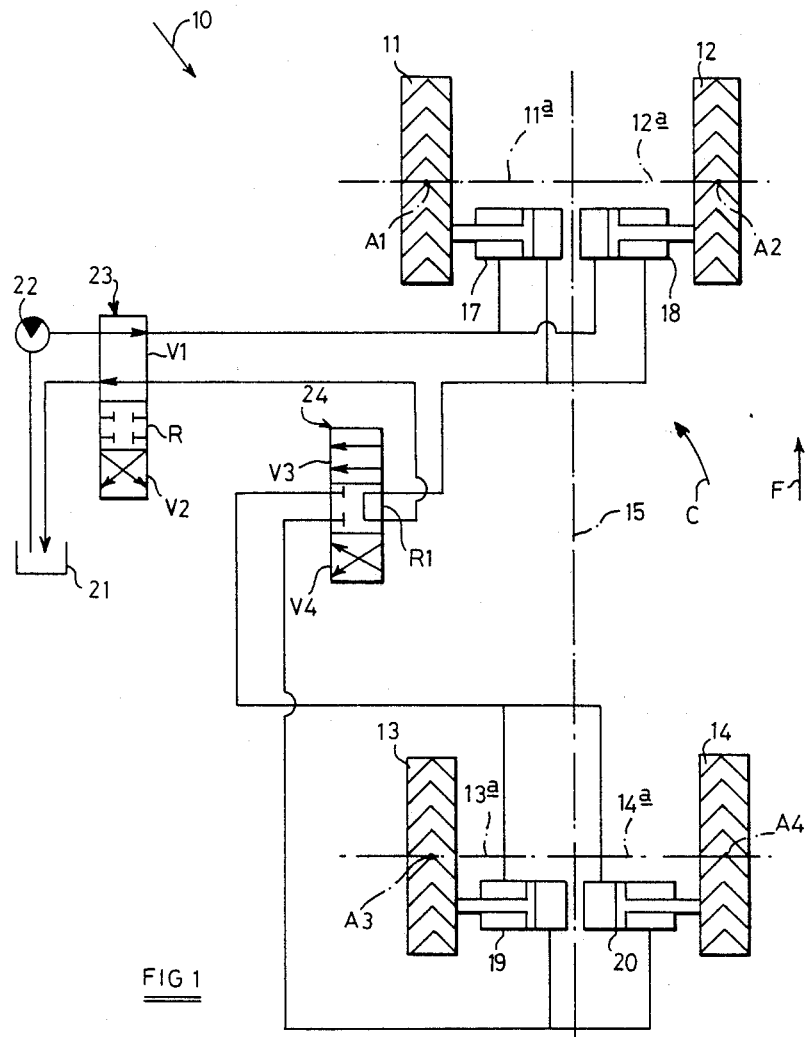
FIG. 1 is a diagrammatic view of a vehicle in accordance with the invention, showing a hydraulic circuit by which steering of the vehicle is effected, hydraulic control valves being shown in the positions they would occupy for simple steering of the vehicle using only the front wheels.

Referring first to FIG. 1 of the drawings, a vehicle 10 comprises four wheels 11,12,13, and 14 mounted in pairs at either side of a longitudinal axis 15 of an elongate chassis of the vehicle 10.

The wheels 11,12, are front wheels and are mounted for rotation about respective rotational axes 11a and 12a as the vehicles moves, and the wheels are movable together by respective double acting hydraulic actuators 17,18, about steering axes A1, A2, sop that the wheels 11,12, may be used for steering the vehicle.

The wheels 13,14, are rear wheels and are similarly mounted for rotation about respective rotational axes 13a and 14a, the wheels 13,14, also being movable together about steering axes A3,A4, by respective double acting hydraulic actuators 19,20, so that the wheels 13,14, may also be used for steering the vehicle 10.

Hydraulic fluid is supplied from a reservoir 21 by a hydraulic pump 22, via a first hydraulic control valve 23 to the actuators 17,18, and/or 19,20, depending on the position in which a second hydraulic control valve 24 is set.

The valve 23 has three operating positions and the position of valve 23 is controlled by the operator e.g. using a steering wheel or another steering control. As shown in FIG. 1, the valve 23 has been moved from a rest position R to a first operating position V1 in which fluid is fed under pressure through valve 23 simultaneously to the annulus side of actuator 17 and to the non annulus side of actuator 18 so that wheels 13 and 14 will each turn anticlockwise about their steering axes A1,A2 whereby the vehicle, when moving forward generally in the direction of arrow F, shown in FIG. 1, will be steered to the left in the general direction indicated by arrow C.

As mentioned above, the actuators 17,18, are double acting in nature. Fluid expelled from the non-annulus side of actuator 17 and the annulus side of actuator 18 is fed via control valve 24 back through the valve 23 to the reservoir 21.

As shown in FIG. 1, the first operating position of control valve 24 is a two wheel or simple steer operating position. The valve 24 is solenoid operated by a control means as hereinafter described. In the rest position R1 shown in FIG. 1, the expelled fluid from the actuators 17 and 18 simply passes through the valve 24, whilst the actuators 19, 20, of the rear wheels 13,14, are locked out i.e. hydraulic fluid cannot pass to or from either of the sides of the actuators 19,20. The wheels 13,14, are shown in an aligned position such that their aces of rotation 13a, 14a are aligned with each other and are generally perpendicular to the longitudinal axis 15 of the vehicle.

Thus the wheels 13,14, take no part in steering the vehicle which is effected solely by the front wheels 11,12.

It will be appreciated that in FIG. 1, although the valve 23 is moved to position V1 to cause the front wheels 11,12, to turn about their axes A1,A2 anticlockwise, the wheels 11,12, are shown in aligned positions in which their axes of rotation 11a, 12a are aligned and generally perpendicular to axis 15 i.e. the wheels are shown just prior to the wheels 11,12, beginning to move.

At the will of the operator, the valve 23 could be moved to the rest position R in which case the actuators 17,18 are also locked out, or to a second operating position V2 in which the direction of flow is completely reversed, i.e. fluid is fed (after passing through valve 24) simultaneously to the non-annulus side of actuator 17 and to annulus side of actuator 18, to effect movement of the wheels 11,12, clockwise about their steering axes A1, A2, to steer the vehicle 10 to the right as it moves in the direction of arrow F, but the rear wheels 13,14, will, whilst valve 24 is in the position shown in FIG. 1, remain stationary.

Figure 2:
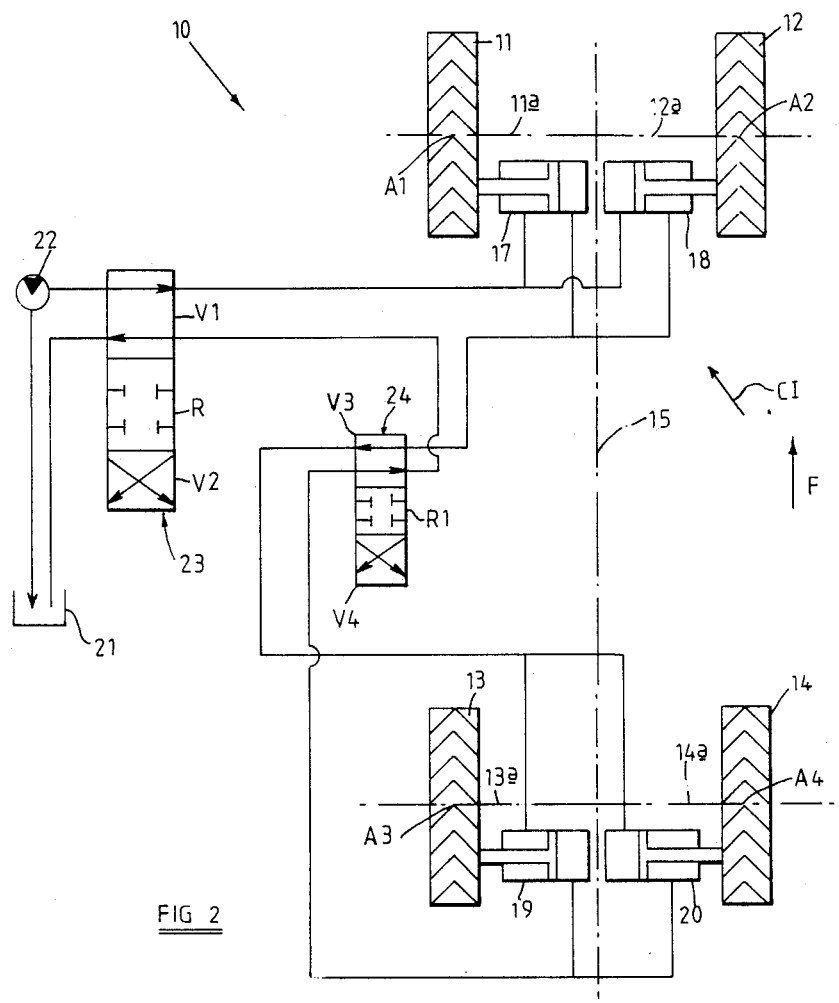
FIG. 2 is a view similar to FIG. 1, but the control valves are shown in the positions they would occupy for compound steering.

Referring now to FIG. 2, each of the components is labelled with the same reference numeral as the components in FIG. 1.

Valve 23 has again been moved to a first operating position V1 in which fluid passes through the valve 23 under pressure simultaneously to the annulus side of actuator 17, and the non annulus side of actuator 18, to effect movement of the front wheels 11,12, anticlockwise about their steering axes A1,A2.

However, the expelled fluid from the non annulus side of actuator 17 and annulus side of actuator 18, does not simply pass back through the valve 24 to valve 23 and to the reservoir 21, but valve 24 has been moved to a four wheel or compound steer position V3 such that the expelled fluid passes through valve 24 to the annulus side of actuator 19 and the non annulus side of actuator 20 to cause movement of the wheels 13,14, anticlockwise about their steering axes A3 and A4.

Thus the rear wheels 13,14, are released and are usable to effect compound steering of the vehicle as it moves generally in the direction of arrow F, the vehicle performing a crabbing motion i.e. moving generally diagonally for example in a direction indicated by arrow C1.

Thus the actuators 19,20 are moved by the fluid ejected from the actuators 17,18.

If the direction of fluid through the valve 23 is reversed by the operator, by moving the valve 23 to its second operating position V2, fluid will be fed to the non-annulus side of the actuator 19 and to the annulus side of actuator 20, to cause the rear wheels 13,14, to move about their steering axes A3,A4 generally clockwise, and fluid ejected from the annulus side of actuator 19 and the non-annulus side of actuator 20, would be fed back through valve 24 to the non-annulus side of actuator 17 and the annulus side of actuator 18 so that the front wheels 11,12, will be moved by the fluid for rotation about their steering axes A1 and A2 generally clockwise and thus the vehicle will move or crab generally diagonally to the right.

Again valve 23 may be moved by the operator to the rest position R in which the wheels 11,12,13,14, will all be locked in the position to which they were previously moved.

Referring now to FIG. 3, again similar components to the vehicle of FIGS. 1 and 2 are labelled by the same reference numerals.

Figure 3:
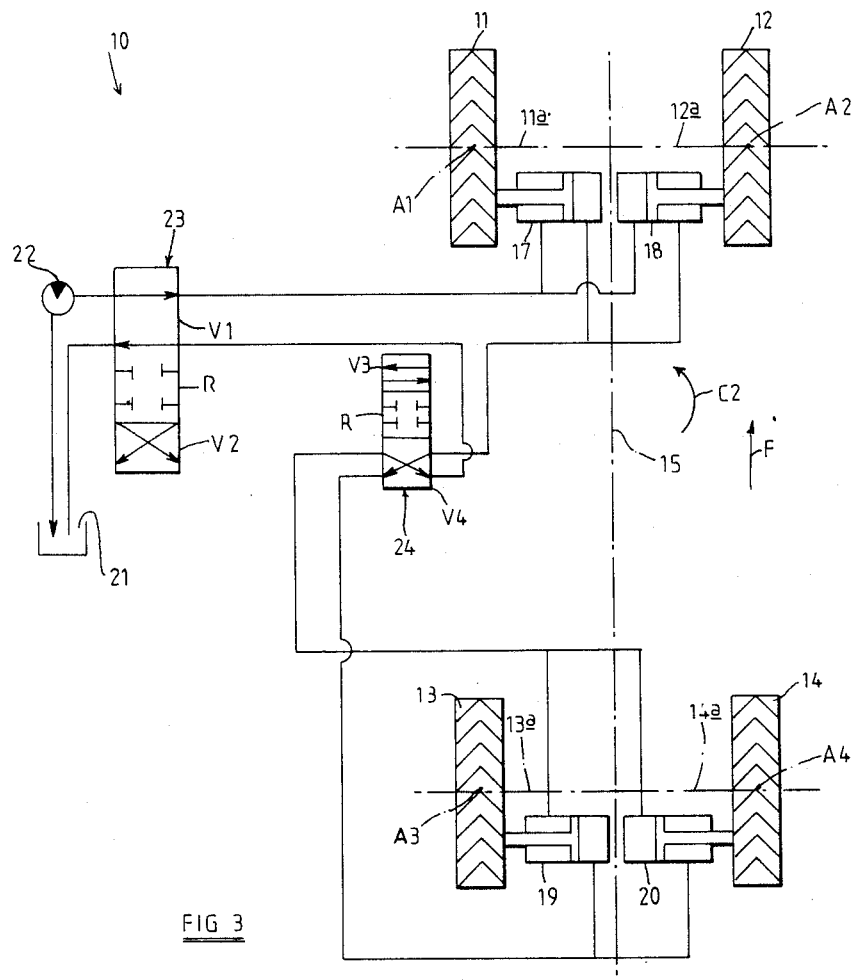
FIG. 3 is a view similar to FIGS. 1 and 2 but with the control valves shown in the position they would occupy for an alternative compound steering operation.

In FIG. 3, the valve 24 has been moved to an alternative compound steering position V4. Again, with the valve 23 in its first operating position V1, fluid is fed through valve 23 to the annulus side of actuator 17 and the non-annulus side of actuator 18 to cause the front wheels 11,12, to move anticlockwise about their steering axes A1,A2.

Fluid ejected from the non-annulus side of actuator 17 and the annulus side of actuator 18 is passed through valve 24 to the non-annulus side of actuator 19 and the annulus side of actuator 20 so that the wheels 13,14, move clockwise about their steering axes A3,A4.

Thus again, the rear wheels 13,14, take an active part in steering the vehicle 10 but always move about their axes A3,A4, in opposition to the direction of movement of the front wheels 13,14, about the axes A12,A2, so that the vehicle performs a "cramping" motion i.e. a very tight turn as the vehicle is moved in the general direction of arrow F, as indicated by the arrow C2.

By reversing the flow of fluid through valve 23, the operator can cause the front wheels 11,12, to be moved clockwise by the fluid ejected from the actuators 19,20, of the rear wheels 13,14, which will move anticlockwise and also valve 23 can be moved to its rest position R so that each of the wheels 11 to 14 are locked in the position to which they were previously set.

Figure 4:
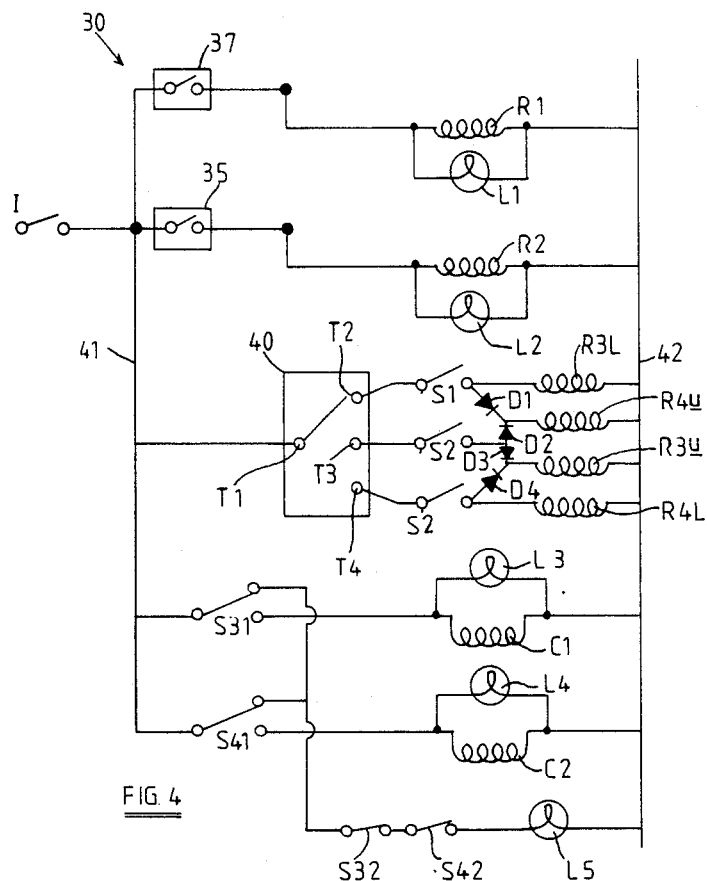
FIG. 4 is a diagrammatic view of a control circuit of a control means for use with the vehicle of FIGS. 1, and, FIG. 5 is a diagrammatic illustration showing the position of proximity switches on steering gear of the vehicle.

As mentioned above, the valve 23 is directly movable by the operator whereas fluid control valve 24 is solenoid operated by a control circuit which is shown generally at 30 in FIG. 4.

It will be appreciated that when the vehicle is being compound steered it is desirable for the front and rear wheels always to be in phase whereby the degree of turn effected by the front and rear wheels is the same so that an anticlockwise movement of 20° for example of the front wheels 11,12, is matched by a 20° clockwise or anticlockwise movement of the rear wheels 13,14, depending on the position of valve 24.

Further, in a simple steering operation, it is desirable for the rear wheels 13 and 14 to be aligned in the positions shown in FIGS. 1 to 3 whereby their axes of rotation 13a, 14a are aligned with each other and are generally perpendicular to the axis 15.

Figure 5:
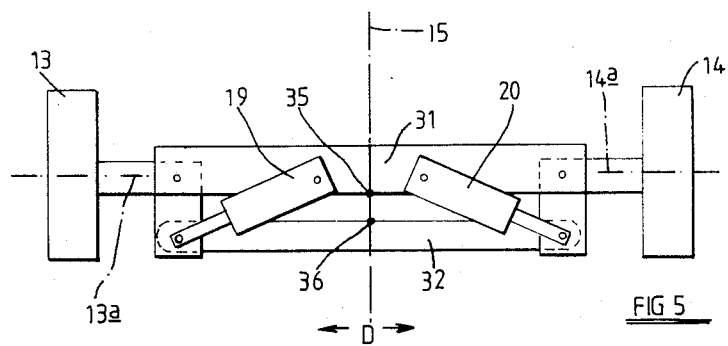

To enable an operator to achieve alignment of the rear wheels 13,14, when changing from compound to simple steering and/or of the front and rear wheels when changing from simple to compound steering, a sensor means is provided associated with each of the front and rear wheels. In FIG. 5, the rear wheels 13,14, are shown which are pivotally mounted on axle 31 secured relative to the chassis of the vehicle. A track rod 32 extends between the wheels 13,14, and is movable in the directions shown by the arrow D by the actuators 19,20 which are pivotally mounted between the axle 31 (or the chassis) and the track rod 32.

The sensor means comprises a proximity switch 35 which is mounted on the axle 31, the switch 35 being for example, of the inductive type which senses when a co-operating part 36 mounted on the track rod 32 is at its their aligned positions where by the axes of rotation of the wheels 13,14, are closest position i.e. in the present instance when the wheels 13 and 14 are aligned with each other and generally perpendicular to the elongate axis 15 of the vehicle.

Other types of switch may be used but preferably the switch senses the proximity of a relatively movable element without contacting the relatively movable element.

A substantially similar arrangement is provided on the front wheels, for mounting a second proximity switch.

Referring now to FIG. 4, a control circuit 30 is shown which incorporates the sensor means and a control means to control valve 24.

At the heart of the circuit is a manually operable selector switch 40 which the operator can control to select simple steering or compound steering by crabbing or cramping.

Two relays are provided, the coils of which are shown in R1 and R2, and the contacts of the relays are shown at S1 and S2, the coils R1 being connected in series with proximity switch 37 associated with the front wheels 11,12, and coil R2 being connected in series with the proximity switch 35 associated with the rear wheels, 13,14, each between a positive power supply rail 41 and a negative supply rail 42, or earth.

The switch 40 is a triple way single pole switch having three "on" positions, the switch 40 when a first operating position permitting current to pass from a terminal T1 which is connected to rail 41, to a second terminal T2 as shown in FIG. 4, and when in a second operating position connecting terminal T1 with a terminal T3, and when in a third operating position connecting terminal T1 with a terminal T4.

The first relay has two sets of contacts S1 each set being connected in series with one of terminals T2 and T4 whilst the second relay has only one set of contacts S2 connected in series with terminal T3.

The circuit 30 includes third and fourth relays which are of the bistable or double acting type each having two coils, one to close the contacts on the relay, and the other to open the contacts of the relay.

Preferably the relays are of the type which mechanically return the open or closed condition of the contacts, whether or not electrical power is maintained to the respective coil, until the other coil is energised.

The "close" coil of the third relay is shown at R3L and the "open" coil of the third relay at R3U, whilst the "close" coil of the fourth relay is shown at R4L and the "open" coil at R4U.

The third relay has two pairs of contacts shown at S31, S32, and the fourth relay has two pairs of contacts shown at S41 and S42.

Two solenoids are used for moving the fluid control valve 24 between its operative and rest positions which are shown at C1 and C2, the arrangement being such that when neither solenoid C1 and C2 is energised, the valve 24 moves to its rest position R with the actuators 19 and 20 of the rear wheels 13 and 14 being locked out, whilst when solenoid C1 is energised and solenoid C2 is not energised, the valve 24 is moved to the FIG. 2 position wherein compound steering is effected, the rear wheels 13,14, moving about the axes A3,A4, in sympathy with the front wheels 11,12, in a crabbing motion. Alternatively, wherein solenoid C2 is energised and solenoid C1 is not energised, the valve 24 is moved to the FIG. 4 position in which compound steering is effected, the rear wheels 13,14, moving about axes A3, A4, in anti-sympathy with the front wheels 11,12, in a cramping motion, as the steering wheel is turned.

The circuit is arranged so that the solenoids C1 and C2 cannot be energised simultaneously.

It can be seen that when the coil R1 of the first relay is energised, an indicator light L1 is illuminated, whilst when the coil R2 of the second relay is energised, a second indicator light 12 is illuminated. Similarly, when coil C1 is energised, a third indicator light 13 is illuminated, whilst when coil C2 is energised, a fourth indicator light 14 is energised. This is the assistance of the operator.

When neither of the coils C1 and C2 are energised, a fifth indicator light 15 becomes illuminated by virtue of the contacts S32 and S42 being closed, and receiving current via an open contact current path from the switches S31 and S41 which are connected to the positive rail 41.

Operation of the vehicle will now be described.

Beginning with the vehicle in simple steer operating mode i.e. with contacts T1 and T3 of the switch 40 connected, if the rear wheels 13 and 14 are aligned, the proximity switch 35 will be closed so that the coil R2 will be energised so that contacts S2 which are in series with the terminal T3 will be connected. Current may thus pass to both the coils R4U and R3U to unlatch both the solenoids C1 and C2 to move or maintain valve 24 in rest position R and hence to lock out the rear wheels 13,14. The vehicle may thus be simply steered by the front wheels 11,12, the operator actuating valve 23 with the steering wheel or other control.

When it is desired to change to compound steering e.g. by crabbing, the operator moves switch 40 provide a control signal to the control means to connect terminals T1 and T2. If the front wheels 11,12 are not aligned in the position shown in FIG. 1, the proximity switch 37 associated with the front wheels will remain open, and accordingly, coil R1 will remain unenergised and contacts S1 will be open. Thus the coils R3L and R4U will remain unaffected. However as the front wheels 11,12, pass through the aligned position, the proximity switch 37 will be closed, energising coil R1 to close the contacts S1 which thus allow current to pass to the coils R3L and R4U which will cause contacts S31 to close and switch S41 to remain open, so that solenoid C1 will be energised to move the valve 24 to its FIG. 2 position V3. Thus the front and rear wheels will be in phase with each other and will move together as valve 23 is adjusted, in sympathy, to steer the vehicle 10. Any unphasing which may occur due to kerbing of the front or rear wheels for example, or simply due to inaccuracies in the hydraulic circuit, may be corrected simply by returning to simple steering made as hereinafter described, and then reselecting compound crabbing steering mode.

To change to simple steering mode, the switch 40 is operated to again signal the control means to connect contacts T1 and T3. The rear wheels 13 and 14 will remain unlocked, and will continue to move in sympathy with the front wheels 11,12, until the rear wheels 13,14, are in their aligned position, when proximity switch 35 will close, thus energising coil R2, closing contacts S2, which will allow the coils R4U and R3U to energise to open the contacts S31 to deactivate the solenoid C1.

The vehicle may be switched to perform compound steering by cramping by moving the switch 40 signal the control means to connect the terminals T1 and T4. Nothing will occur until the front wheels 11,12, are aligned when proximity switch 37 will close to energise relay R1 to close contacts S1 and energise coils R3U and R4L to close contacts S41 to energise coil C2, to move valve 24 to the FIG. 4 position V4.

Solenoid C2 will remain energised until both the position of switch 40 has been changed and the rear wheels 13,14, are aligned to close proximity switch 35.

Thus the operator may switch the steering made between simple and compound steering, or between crabbing or cramping, at will, by changing the position of the switch 40, and then aligning the front/rear wheels 11,12,13,14, as required, by operating valve 23.

It can be seen in FIG. 4, that diodes D1 to D4 are provided between the coils R3L, and R4U, R4U, and R3U, R3U and R4L, to permit current to pass from the respective contacts S1 and S2 only to the desired coils when the appropriate contacts S1 and S2 are connected.

The circuit described is only an example of a control circuit which may be used with the sensor means which comprises the proximity switches 35 and 37. Various modifications may be made, for example the indicator lights L1 to L5 need not be required, and instead of relays having coils, solid state switching arrangements preferably of the latching kind, may alternatively be provided.

In an alternative arrangement, a simplified circuit may be provided where for example the vehicle is only intended to achieve either simple and crabbing or simple and cramping steering operations.

Figure 6:
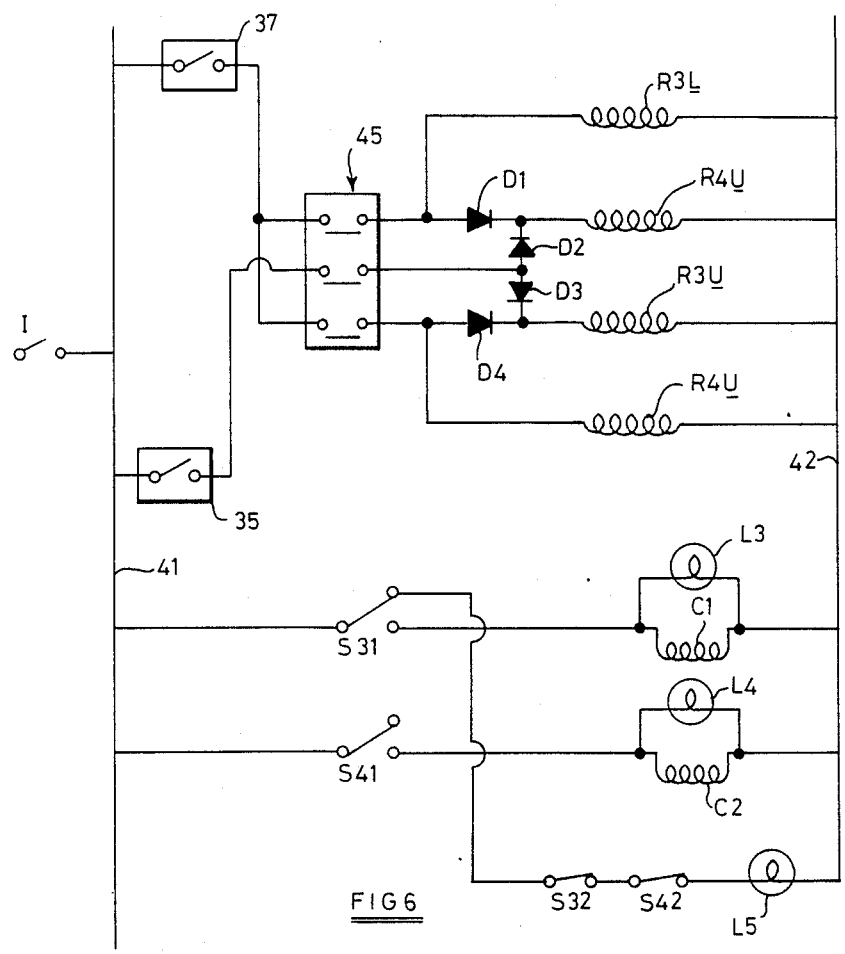
FIG. 6 is a diagrammatic view of an alternative control circuit to that shown in FIG. 4.

FIG. 6 shows an alternative circuit to that shown in FIG. 4, in which the triple way single pole switch 40, is replaced by a three pole switch 45 which enables relays R1 and R2 to be deleted from the circuit. Instead, the switch 45 is directly coupled to the proximity switches 35,37, and to the coils R3U, R4U, R3L, R4L, of the relays controlling solenoids C1,C2.

It will be appreciated by those skilled in the art, that the valve shown at 23 in FIGS. 1 to 3 is a very simplified illustration of a practical valve which is readily commercially available, which would be required to enable an operator to achieve accurate steering of his vehicle.

In practice, a proportional valve, such as a Danfoss steering valve would be required such as one called OSPB valves, versions ON, OR, and CN, but the exact nature of the valve 23 used in not crucial to the working of the present invention, and hence the valve shown at 23 is only a diagrammatic illustration of one simple type of valve to facilitate understanding of the invention.

It will be appreciated that in the event of an interruption in power supply to the circuit of FIG. 4 or FIG. 6, for example by operation of an ignition switch 1, because the relays or other switches which control the solenoid operated valves are of the latching type, when power is restored, the steering mode last selected by the operator will at least initially be effected, and that change in steering mode can only be effected upon operating the selector means 40 or 45, and receipt of an appropriate signal from one of the sensor means.

We claim:

1. A vehicle of the kind comprising an elongate chassis, two pairs of ground wheels, means mounting said ground wheels with the wheels of each pair on opposite sides of the chassis, the ground wheels being movable by an operator to effect steering of the vehicle and at least one pair of the wheels being lockable in the position such that steering is effected solely by the other pair of wheels, a control means, sensor means associated with each of the two pairs of wheels to provide an electrical signal to the control means when the respective wheels are in an aligned position in which their axes of rotation are generally perpendicular to a longitudinal axis of the vehicle, the control means including a selector means comprising electrical switch means to enable an operator to select one of a simple steering mode in which only one of the pairs of wheels are movable to effect steering and a compound steering mode in which both of the pairs of wheels are movable to effect steering, the control means further comprising means to maintain the selected steering mode until an alternative steering mode is selected by operation of the selector means and the control means receives a signal from at least one of the sensor means associated with one of the pairs of the wheels.

2. A vehicle according to claim 1 wherein steering of the vehicle is effected by moving the wheels of the vehicle solely by using hydraulic actuators operated by hydraulic valve means.

3. A vehicle according to claim 1 or claim 2 wherein electrically operated valve means controlled by the control means is provided in one mode of operation to lock at least one of the pairs of wheels in an aligned position and in another mode of operation to permit both of the pairs of wheels to move together, each in response to a steering control.

4. A vehicle according to claim 3 wherein the electrically operated valve means are solenoid operated.

5. A vehicle according to claim 1 wherein an indicator means is provided to indicate appropriately to the operator which steering mode is selected.

6. A vehicle according to claim 1 wherein the signal provided by the sensor means is one of the completion and interruption of the electrical circuit.

7. A vehicle of the kind comprising an elongate chassis, two pairs of ground wheels, means mounting said ground wheels with the wheels of each pair on opposite sides of the chassis, the ground wheels being movable by an operator to effect steering of the vehicle and at least one pair of the wheels being lockable in the position such that steering is effected solely by the other pair of wheels, a control means, sensor means associated with each of the two pairs of wheels to provide an electrical signal to the control means when the respective wheels are in an aligned position in which their axes of rotation are generally perpendicular to a longitudinal axis of the vehicle, the control means including a selector means comprising electrical switch means to enable an operator to select one of a simple steering mode in which only one of the pairs of wheels are movable to effect steering and a compound steering mode in which both of the pairs of wheels are movable to effect steering, the control means further comprising means to maintain the selected steering mode until an alternative steering mode is selected by operation of the selector means and the control means receives a signal from at least one of the sensor means associated with one of the pairs of the wheels, wherein solenoid operated valve means controlled by the control means is provided in one mode of operation to lock at least one of the pairs of wheels in an aligned position and in another mode of operation to permit both of the pairs of wheels to move together, each in response to a steering control, and wherein the control means includes a latchable switch means which operates when unlatched to cause the electrically operated valve means to be operated to lock at least one pair of wheels in an aligned position, and latchable switch means which when latched operating a solenoid to cause the electrically operated switch means to be operated to permit both of the pair of wheels to move together in response to a steering control.

8. A vehicle according to claim 7 wherein the electrically operated valve means has a first and second solenoids, the control means including a first latchable switch means which when latched operates the first solenoid whereby vehicle steering is effected in a first compound steering mode, and a second latchable switch means which, when operated, operates the second solenoid whereby steering is effected in a second compound steering mode.

9. A vehicle according to claim 7 wherein the latchable switch means comprises a bi-stable relay.

10. A vehicle according to claim 7 wherein the latched switch means remains latched until an alternative steering mode is selected by the operator and a signal is received from at least one of the sensor means.

11. A vehicle of the kind comprising an elongate chassis, two pairs of ground wheels, means mounting said ground wheels with the wheels of each pair on opposite sides of the chassis, the ground wheels being movable by an operator to effect steering of the vehicle and at least one pair of the wheels being lockable in the position such that steering is effected solely by the other pair of wheels, a control means, sensor means associated with each of the two pairs of wheels to provide an electrical signal to the control means when the respective wheels are in an aligned position in which their axes of rotation are generally perpendicular to a longitudinal axis of the vehicle, the control means including a selector means comprising electrical switch means to enable an operator to select one of a simple steering mode in which only one of the pairs of wheels are movable to effect steering and a compound steering mode in which both of the pairs of wheels are movable to effect steering, the control means further comprising means to maintain the selected steering mode until an alternative steering mode is selected by operation of the selector means and the control means receives a signal from at least one of the sensor means associated with one of the pairs of the wheels, wherein means are provided to isolate the control means from any power supply, the control means, when power is restored, at least initially effecting the steering mode selected when the control means was isolated.

12. A vehicle of the kind comprising an elongate chassis, two pairs of ground wheels, means mounting said ground wheels with the wheels of each pair on opposite sides of the chassis, the ground wheels being movable by an operator to effect steering of the vehicle and at least one pair of the wheels being lockable in the position such that steering is effected solely by the other pair of wheels, a control means, sensor means associated with each of the two pairs of wheels to provide an electrical signal to the control means when the respective wheels are in an aligned position in which their axes of rotation are generally perpendicular to a longitudinal axis of the vehicle, the control means including a selector means comprising electrical switch means to enable an operator to select one of a simple steering mode in which only one of the pairs of wheels are movable to effect steering and a compound steering mode in which both of the pairs of wheels are movable to effect steering, the control means further comprising means to maintain the selected steering mode until an alternative steering mode is selected by operation of the selector means and the control means receives a signal from at least one of the sensor means associated with one of the pairs of the wheels, wherein each of the sensor means comprises a proximity switch associated with the steering gear which effects movement of the respective pair of wheels, the switch sensing the proximity of a relatively movable element without contacting the relatively movable element.

13. A method of operating a vehicle comprising an elongate chassis, two pairs of ground wheels, means mounting said ground wheels with the wheels of each pair on opposite sides of the chassis, the ground wheels being movable by an operator to effect steering of the vehicle and at least one pair of the wheels being lockable in the position such that steering is effected solely by the other pair of wheels, the control means including a selector means comprising electrical switch means to enable an operator to select one of a simple steering mode in which only one of the pairs of wheels are movable to effect steering and a compound steering mode in which both of the pairs of wheels are movable to effect steering, the control means further comprising means to maintain the selected steering mode until an alternative steering mode is selected by operation of the selector means and the control means receives a signal from at least one of the sensor means associated with one of the pairs off wheels, said method including the step of selecting on the selector means simple steering mode and operating a steering control to bring one of the pairs of wheels to an aligned position at which the pairs of wheels becomes immovable and reselecting compound steering mode and bringing the still movable pair of wheels to an aligned position using the steering control when compound steering mode will be effected.

* * * * *